(12) United States Patent
Hinckley et al.

(10) Patent No.: US 9,519,419 B2
(45) Date of Patent: Dec. 13, 2016

(54) SKINNABLE TOUCH DEVICE GRIP PATTERNS

(75) Inventors: Kenneth P. Hinckley, Redmond, WA (US); Paul Henry Dietz, Redmond, WA (US); Hrvoje Benko, Seattle, WA (US); Desney S. Tan, Kirkland, WA (US); Steven Nabil Bathiche, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 243 days.

(21) Appl. No.: 13/352,193

(22) Filed: Jan. 17, 2012

(65) Prior Publication Data

US 2013/0181902 A1 Jul. 18, 2013

(51) Int. Cl.
| | |
|---|---|
| G06F 3/02 | (2006.01) |
| G06F 3/0488 | (2013.01) |
| G06F 1/16 | (2006.01) |
| G06F 3/041 | (2006.01) |

(52) U.S. Cl.
CPC ............ G06F 3/0488 (2013.01); G06F 1/169 (2013.01); G06F 1/1626 (2013.01); G06F 1/1684 (2013.01); G06F 3/041 (2013.01)

(58) Field of Classification Search
CPC .. G06F 3/041; G06F 3/044; G06F 2200/1636; G06K 9/0035; H04N 21/42222
USPC .................. 345/168, 169, 173, 441; 715/863
See application file for complete search history.

(56) References Cited

U.S. PATENT DOCUMENTS

| | | | |
|---|---|---|---|
| 7,338,224 B2 | 3/2008 | Jones et al. | |
| 8,345,008 B2 | 1/2013 | Lee et al. | |
| 9,047,009 B2 | 6/2015 | King | |
| 9,367,205 B2 | 6/2016 | Hinckley et al. | |
| 2003/0095095 A1 | 5/2003 | Pihlaja | |
| 2006/0197750 A1* | 9/2006 | Kerr et al. | ..................... 345/173 |
| 2006/0197753 A1 | 9/2006 | Hotelling | |
| 2006/0284852 A1 | 12/2006 | Hofmeister et al. | |

(Continued)

FOREIGN PATENT DOCUMENTS

| | | |
|---|---|---|
| CN | 101609383 | 12/2009 |
| WO | WO 2009131987 A2 * | 10/2009 |

OTHER PUBLICATIONS

"International Search Report", Mail Date: Apr. 8, 2013, Application No. PCT/US2013/020413, Filed date: Jan. 5, 2013, pp. 10.

(Continued)

*Primary Examiner* — Michael Pervan
*Assistant Examiner* — Andrew Lee
(74) *Attorney, Agent, or Firm* — Judy Yee; Micky Minhas (57) ABSTRACT

Skinnable touch device grip pattern techniques are described herein. A touch-aware skin may be configured to substantially cover the outer surfaces of a computing device. The touch-aware skin may include a plurality of skin sensors configured to detect interaction with the skin at defined locations. The computing device may include one or more modules operable to obtain input from the plurality of skin sensors and decode the input to determine grips patterns that indicate how the computing device is being held by a user. Various functionality provided by the computing device may be selectively enabled and/or adapted based on a determined grip pattern such that the provided functionality may change to match the grip pattern.

20 Claims, 7 Drawing Sheets

(56) References Cited

U.S. PATENT DOCUMENTS

| | | | |
|---|---|---|---|
| 2009/0074255 A1 | 3/2009 | Holm | |
| 2009/0184921 A1 | 7/2009 | Scott et al. | |
| 2010/0039392 A1 | 2/2010 | Pratt et al. | |
| 2010/0042827 A1 | 2/2010 | Pratt et al. | |
| 2010/0060607 A1 | 3/2010 | Ludwig | |
| 2010/0066694 A1 | 3/2010 | Jonsdottir | |
| 2010/0103136 A1 | 4/2010 | Ono et al. | |
| 2010/0134423 A1* | 6/2010 | Brisebois et al. | 345/173 |
| 2010/0164897 A1* | 7/2010 | Morin et al. | 345/173 |
| 2010/0220900 A1 | 9/2010 | Orsley | |
| 2011/0043475 A1* | 2/2011 | Rigazio et al. | 345/173 |
| 2011/0115784 A1* | 5/2011 | Tartz et al. | 345/419 |
| 2011/0159915 A1 | 6/2011 | Yano et al. | |
| 2011/0167350 A1 | 7/2011 | Hoellwarth | |
| 2011/0167391 A1 | 7/2011 | Momeyer et al. | |
| 2011/0187647 A1* | 8/2011 | Woloszynski et al. | 345/168 |
| 2011/0242138 A1 | 10/2011 | Tribble | |
| 2011/0261058 A1 | 10/2011 | Luo | |
| 2012/0032979 A1* | 2/2012 | Blow et al. | 345/647 |
| 2012/0075194 A1 | 3/2012 | Ferren | |
| 2012/0311476 A1 | 12/2012 | Campbell | |
| 2012/0324384 A1 | 12/2012 | Cohen et al. | |
| 2013/0300668 A1 | 11/2013 | Churikov | |
| 2015/0261362 A1 | 9/2015 | King | |

OTHER PUBLICATIONS

Saini, et al., "Designing of a Virtual System with Fingerprint Security by considering many Security threats", Retrieved at http://www.ijcaonline.org/volume3/number2/pxc387995.pdf>>, International Journal of Computer Applications (0975-8887), vol. 3, No. 2, Jun. 2010, pp. 25-31.

Boudreaux, Toby, "Touch Patterns: Chapter 6—Programming the iPhone User Experience", Retrieved at <<http://oreilly.com/iphone/excerpts/iphone-programming-user/touch-patterns.html>>, Retrieved Date: Oct. 25, 2011, pp. 12.

Findlater, et al., "Personalized Input: Improving Ten-Finger Touchscreen Typing through Automatic Adaptation", *Proceedings of the SIGCHI Conference on Human Factors in Computing Systems*, Available at <http://terpconnect.umd.edu/~leahkf/pubs/CHI2012-findlater-PersonalizedTyping.pdf>,(May 5, 2012),10 pages.

Goel, et al., "GripSense: Using Built-In Sensors to Detect Hand Posture and Pressure on Commodity Mobile Phones", *Proceedings of the 25th Annual ACM Symposium on User Interface Software and Technology*, (Oct. 7, 2012), pp. 545-554.

Hinckley, Ken et al., "Sensor Synaethesia: Touch in Motion, and Motion in Touch", *CHI 2011*, May 7-12, 2011, available at <http://research.microsoft.com/en-us/um/people/kenh/papers/touch-motion-camera-ready-final.pdf>,(May 7, 2011),10 pages.

Hirche, et al., "Adaptive Interface for Text Input on Large-Scale Interactive Surfaces", *3rd IEEE International Workshop on Horizontal Interactive Human Computer System*, (Oct. 1, 2008), pp. 153-156.

Lee, Tyler "The TypeWay iPad app is an adaptive on-screen keyboard", Retrieved from <http://www.ubergizmo.com/2012/02/the-typeway-ipad-app-is-an-adaptive-on-screen-keyboard/> on Mar. 7, 2013, (Feb. 1, 2012), 2 pages.

Moore, Charles "TypeWay Adaptive Keyboard for iPad Review", Retrieved from <http://www.technologytell.com/apple/89378/typeway-adaptive-keyboard-for-ipad-review/> on Mar. 6, 2013, (Feb. 5, 2012),10 pages.

Sajid, Uzair "Microsoft Patent a Futuristic Virtual Multitouch Keyboard", Retrieved from <http://thetechnopath.com/microsoft-patent-futuristic-virtual-multitouch-keyboard/857/> on Mar. 6, 2013, (Sep. 27, 2009), 8 pages.

Sax, et al., "LiquidKeyboard: An Ergonomic, Adaptive QWERTY Keyboard for Touchscreens", *Proceedings of Fifth International Conference on Digital Society*, (Feb. 23, 2011), pp. 117-122.

"Non-Final Office Action", U.S. Appl. No. 13/898,452, Feb. 24, 2014, 24 pages.

"Final Office Action", U.S. Appl. No. 13/898,452, Jun. 9, 2014, 26 pages.

"Non-Final Office Action", U.S. Appl. No. 13/898,452, Sep. 26, 2014, 21 pages.

"Decision on Reexamination", CN Application No. 201110044285.5, Mar. 26, 2015, 14 Pages.

"Final Office Action", U.S. Appl. No. 13/898,452, Mar. 27, 2015, 23 pages.

"Final Office Action", U.S. Appl. No. 14/099,798, Nov. 25, 2015, 19 pages.

"Notice of Allowance", U.S. Appl. No. 12/709,301, Feb. 24, 2016, 7 pages.

"Non-Final Office Action", U.S. Appl. No. 13/898,452, Sep. 14, 2015, 23 pages.

"Extended European Search Report", EP Application No. 13738283.4, Aug. 4, 2015, 7 pages.

"Foreign Office Action", CN Application No. 201110044285.5, Dec. 22, 2014, 8 Pages.

"Foreign Office Action", CN Application No. 201110046519.X, Sep. 21, 2015, 16 Pages.

"Foreign Office Action", CN Application No. 201180009579.2, Sep. 6, 2015, 19 pages.

"Non-Final Office Action", U.S. Appl. No. 12/709,301, Nov. 19, 2015, 8 pages.

"Notice on Reexamination", CN Application No. 201110044285.5, Jul. 23, 2014, 8 Pages.

Hotelling,"Multi-functional hand-held device", U.S. Appl. No. 60/658,777, filed Mar. 4, 2015, 117 pages.

Hotelling,"Multi-functional hand-held device", U.S. Appl. No. 60/663,345, filed Mar. 16, 2005, 76 pages.

"Final Office Action", U.S. Appl. No. 13/898,452, Mar. 10, 2016, 25 pages.

"Foreign Office Action", CN Application No. 201380005804.4, Mar. 1, 2016, 13 Pages.

Non-Final Office Action, U.S. Appl. No. 13/898,452, Jul. 28, 2016, 26 pages.

Foreign Notice of Allowance, CN Application No. 201380005804.4, Sep. 30, 2016, 4 pages.

* cited by examiner

SKINNABLE TOUCH DEVICE GRIP PATTERNS

BACKGROUND

One of the challenges that faces designers of devices having user-engageable displays, such as touchscreen displays, pertains to providing enhanced functionality for users, through gestures that can be employed with the devices. This is so, not only with devices having larger or multiple screens, but also in the context of devices having a smaller footprint, such as tablet PCs, hand-held devices, mobile phone, smaller multi-screen devices and the like.

Due in part to the small size of some devices and touchscreens, the types and number "on-screen" gestures (e.g., gestures applied to a touchscreen) that can be provided by a particular device may be limited. Moreover, on-screen gestures may interfere with content presentations in some contexts, such as by occluding a video presentation or a portion of digital book a user is viewing. Accordingly, traditional on-screen gestures and input techniques may limit users and/or may be insufficient in some scenarios, use cases, or specific contexts of use.

SUMMARY

Skinnable touch device grip pattern techniques are described. In one or more embodiments, a computing device is configured to include a touch-aware skin. The touch-aware skin may cover substantially the outer surfaces of the computing device that are not occupied by other components such as a display device, camera, buttons, and other controls. The touch-aware skin may include a plurality of skin sensors capable of detecting interaction with the skin at defined locations. The computing device may include one or more modules operable to obtain input from the plurality of skin sensors and decode the input to determine grips patterns that indicate how the computing device is being held by a user. Various functionality provided by the computing device may be selectively enabled and/or adapted based on a determined grip pattern such that the provided functionality may change to match the grip pattern.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Skinnable touch device grip pattern techniques are described. In one or more embodiments, a computing device is configured to include a touch-aware skin. The touch-aware skin may cover multiple surfaces (e.g. at least two surfaces) and/or substantially cover the outer surfaces of the computing device. The touch-aware skin may include a plurality of skin sensors configured to detect interaction with the skin at defined locations. This may include detecting direct contact, proximity to the skin, forces applied to the skin, deformation, and so forth. The computing device may include one or more modules, such as a skin driver module, operable to obtain input from the plurality of skin sensors and decode the input to determine grips patterns that indicate how the computing device is being held by a user. Various functionality provided by the computing device may be selectively enabled and/or adapted based on a determined grip pattern, such that the provided functionality matches the grip pattern. Thus, different interactions with a touch-aware skin may be employed to cause corresponding responses by a device and enable different device functionality. Grip patterns and input detected via a touch-aware skin may be used alone and/or in combination with other kinds of input and aspects of device usage including but not limited to contact, gestures, and touch interaction recognized via a touchscreen; motion of the device captured via inertial sensors; and/or operation of controls such as physical buttons, switches, levers, and keys provided by the device.

In the following discussion, an example environment is first described that is operable to employ the skinnable touch device grip pattern techniques described herein. Example devices and procedures are then described, which may be employed in the example environment, as well as in other environments. Accordingly, the example devices and procedures are not limited to the example environment and the example environment may incorporate devices and procedures in addition to the examples described herein. Lastly, an example computing system is described that can be employed to implement skinnable touch device grip pattern techniques in one or more embodiments.

Operating Environment

Figure 1:
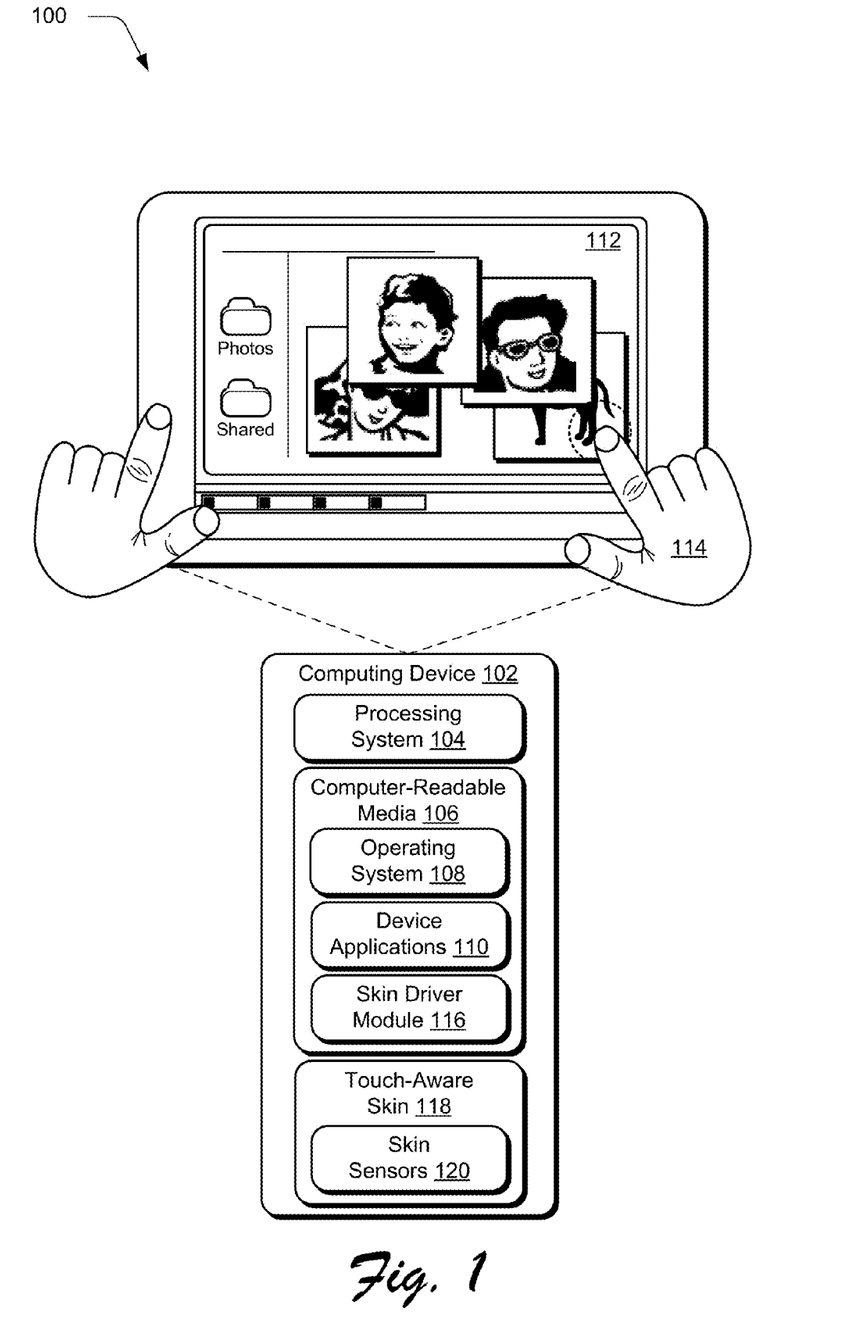
FIG. 1 is an illustration of an example implementation of an environment that is operable to employ skinnable touch device grip pattern techniques described herein.

FIG. 1 is an illustration of an example operating environment 100 that is operable to employ the techniques described herein. The operating environment includes a computing device 102 having a processing system 104 and computer-readable media 106 that is representative of various different types and combinations of media, memory, and storage components and/or devices that may be associated with a computing device. The computing device 102 is further illustrated as including an operating system 108 and one or more device applications 110 that may reside on the computer-readable media (as shown), may be implemented at least partially by one or more hardware elements, and/or may be executed via the processing system 104. Computer-readable media 106 may include both "computer-readable storage media" and "communication media," examples of which can be found in the discussion of the example computing system of FIG. 7. The computing device 102 may be configured as any suitable computing system and/or device that employ various processing systems 104 examples of which are also discussed in relation to the example computing system of FIG. 7.

In the depicted example, the computing device 102 includes a display device 112 that may be configured as a touchscreen to enable touchscreen and gesture functionality. The device applications 110 may include a display driver, gesture module, and/or other modules operable to provide touchscreen and gesture functionality enabled by the display device 112. Accordingly, the computing device may be configured to recognize input and gestures that cause corresponding operations to be performed.

For example, a gesture module may be configured to recognize a touch input, such as a finger of a user's hand 114 as on or proximate to the display device 112 of the computing device 102 using touchscreen functionality. A variety of different types of gestures may be recognized by the computing device including, by way of example and not limitation, gestures that are recognized from a single type of input (e.g., touch gestures) as well as gestures involving multiple types of inputs. For example, can be utilized to recognize single-finger gestures and bezel gestures, multiple-finger/same-hand gestures and bezel gestures, and/or multiple-finger/different-hand gestures and bezel gestures. Further, the computing device 102 may be configured to detect and differentiate between gestures, touch inputs, grip patterns, a stylus input, and other different types of inputs. Moreover, various kinds of inputs obtained from different sources, including the gestures, touch inputs, grip patterns, stylus input and inputs obtained through a mouse, touchpad, software or hardware keyboard, and/or hardware keys of a device (e.g., input devices), may be used in combination to cause corresponding device operations.

To implement skinnable touch device grip pattern techniques, the computing device 102 may further include a skin driver module 116 and a touch-aware skin 118 that includes or otherwise makes uses of a plurality of skin sensors 120. The skin driver module 116 represent functionality operable to obtain and use various input from the touch-aware skin 118 that is indicative of grip patterns, user identity, "on-skin" gestures applicable to the skin, and so forth. The skin driver module 116 may process and decode input that is received through various skin sensors 120 defined for and/or disposed throughout the touch-aware skin 118 to recognize such grip patterns, user identity, and/or "on-skin" gestures and cause corresponding actions. Generally, the skin sensors 120 may be configured in various ways to detect actual contact (e.g., touch) and/or near surface interaction (proximity detection) with a device, examples of which are discussed in greater detail below.

For example, a grip pattern indicating a particular manner in which a user is holding or otherwise interacting with the computing device 102 may be detected and used to drive and/or enable functionality of the computing device 102 associated with the grip pattern. Recognition of grip patterns and other on-skin input through a touch-aware skin 118 is therefore distinguishable from recognition of touchscreen input/gestures (e.g., "on-screen" gestures) applied to a display device 112 as discussed above. The touch-aware skin 118 and display device 112 may be implemented as separate components through which on-skin and on-screen inputs may respectively be received independently of one another. In at least some embodiments, though, combinations of on-skin input and touchscreen input/gestures may be configured to drive associated actions. The touch-aware skin 118 and skin sensors 120 may be implemented in various ways, examples of which are discussed in relation to the following figures.

Having described an example operating environment, consider now a discussion of some example implementation details regarding a touch-aware skin suitable to implement techniques for skinnable touch device grip patterns in one or more embodiments.

Touch-Aware Skin Details

Figure 2:
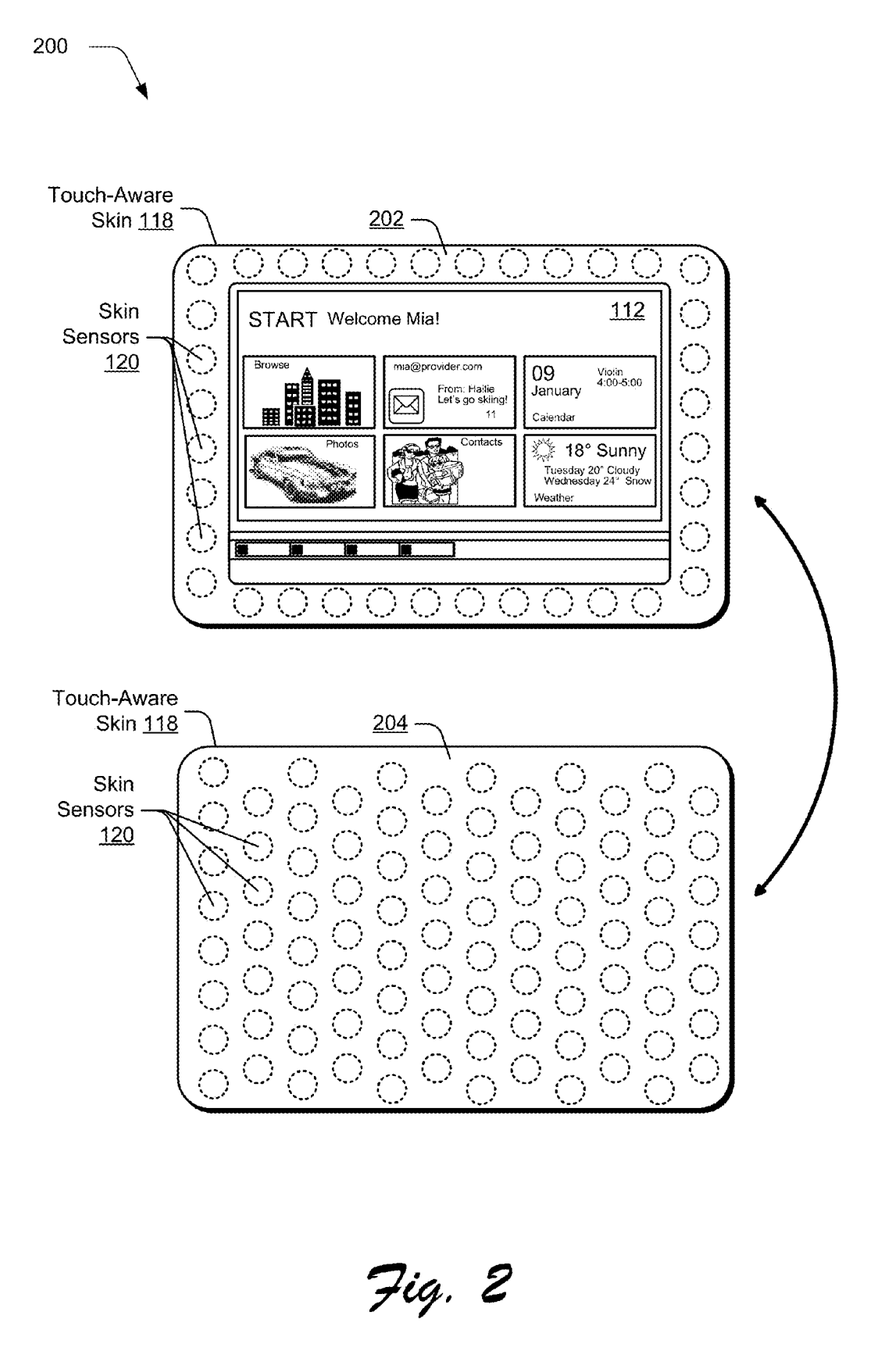
FIG. 2 depicts details of an example computing device that includes a touch-aware skin.
Figure 3:
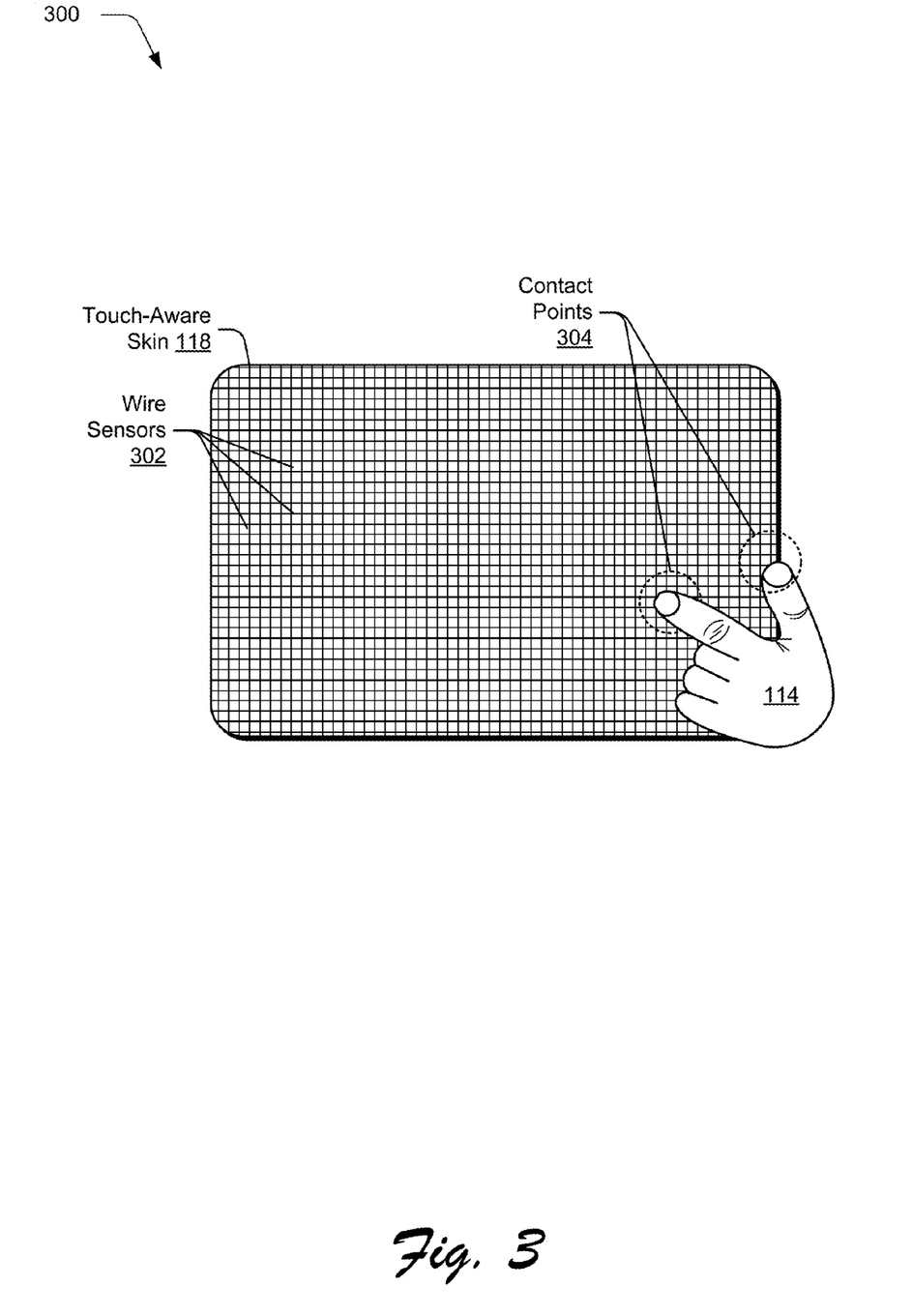
FIG. 3 depicts an example implementation of a touch-aware skin for a computing device.

In this section, details regarding a touch-aware skin are described in relation to example devices of FIG. 2 and FIG. 3. A touch-aware skin is generally configured to enable various on-skin input and/or gestures that are applied to the outer surfaces and/or housing of a computing device 102 that includes the touch-aware skin. Such on-skin input may be used in addition to, in lieu of, and/or in combination with other kinds of input including touchscreen input and input from various input devices.

In particular, FIG. 2 depicts generally at 200 an example computing device 102 of FIG. 1 that includes a touch-aware skin 118 having a plurality of skin sensors 120. FIG. 2 illustrates an array or grid of skin sensors 120 that are disposed at locations across the touch-aware skin 118. In particular, example surfaces 202 and 204 of the computing device 102 are depicted as having skin sensors 120 that are arranged across the surfaces in a pattern or grid. Naturally, coverage of skin sensors 120 may also extend across edges and other surfaces of a device, such skin sensors are associated with substantially the available surfaces of the device.

The touch-aware skin 118 can be configured as an integrated part of the housing for a device. The touch-aware skin 118 may also be provided as an attachable and/or removable add-on for the device that can be connected through a suitable interface, such as being incorporated with an add-on protective case. Further, the touch-aware skin 118 may be constructed of various materials. For example, the touch-aware skin 118 may be formed of rigid metal, plastic, touch-sensitive pigments/paints, and/or rubber. The touch-aware skin 118 may also be constructed using flexible materials that enable bending, twisting, and other deformations of the device that may be detected through associated skin sensors 120. According, the touch-aware skin 118 may be configured to enable detection of one or more of touches on the skin (direct contact), proximity to the skin (e.g., hovering just above the skin and/or other proximate inputs), forces applied to the skin (pressure, torque, sheer), deformations of the skin (bending and twisting), and so forth. To do so, a touch-aware skin 118 may include various different types and numbers of skin sensors 120.

The skin sensors 120 may be formed as physical sensors that are arranged at respective locations within or upon the touch-aware skin 118. For instance, sensors may be molded within the skin, affixed in, under, or on the skin, produced by joining layers to form a touch-aware skin, and so forth. In one approach, sensors may be molded within the touch-aware skin 118 as part of the molding process for the device housing or an external add-on skin device. Sensors may also be stamped into the skin, micro-machined around a housing/case, connected to a skin surface, or otherwise be formed with or attached to the skin. Skin sensors 120 may therefore be provided on the exterior, interior, and/or within the skin. Thus, the skin sensors 120 depicted in FIG. 2 may represent different locations associated with a skin at which different sensors may be physically placed.

In another approach, the skin may be composed of one or more continuous sections of a touch-aware material that are formed as a housing or covering for a computing device. A single section or multiple sections joined together may be employed to form a skin. In this case, the one or more continuous sections may be logically divided into multiple sensor locations that may be used to differentiate between different on skin inputs. Thus, the skin sensors 120 depicted in FIG. 2 may represent logical locations associated with a skin at which different sensors may be logically placed.

A variety of different kinds of skins sensors 120 are contemplated. Skin sensors 120 provide at least the ability to distinguish between different locations at which contact with the skin is made by a user's touch, an object, or otherwise. For example suitable skin sensors 120 may include, but are not limited to, individual capacitive touch sensors, wire contacts, pressure-sensitive skin material, thermal sensors, micro wires extending across device surfaces that are molded within or upon the surfaces, micro hairs molded or otherwise formed on the exterior of the device housing, capacitive or pressure sensitive sheets, and the like.

Some skin sensors 120 of a device may also be configured to provide enhanced capabilities, such as fingerprint recognition, thermal data, force and shear detection, skin deformation data, contact number/size distinctions, and so forth. Thus, a plurality of sensors and materials may be used to create a physical and/or logical array or grid of skin sensors 120 as depicted in FIG. 2 that define particular locations of the skin at which discrete on skin input may be detected, captured, and processed.

To further illustrate, FIG. 3 depicts generally at 300 another example computing device 102 of FIG. 1 that includes a touch-aware skin 118 having a plurality of skin sensors 120. In this example, the skin sensors are configured as wire sensors 302 disposed across surfaces of the device to form a grid. The wire sensors 302 may be molded into a mylar, rubber, or other suitable device housing or case. As depicted, the wires establish a grid upon which various contacts points 304 from a user's hand 114 (or other objects) may be detected and tracked. For instance, the grid may be calibrated to create a defined coordinate system that a skin driver module 116 can recognize to process inputs and cause corresponding actions. Thus, skin sensors 120, such as the example wire sensors 302, can be used to determine particular grip patterns and/or gestures applied to the skin of a device that drive particular operations and/or selectively enable particular device functionality.

Having described some details regarding a touch-aware skin, consider now some example procedures for skinnable touch device grip patterns in accordance with one or more embodiments.

Example Procedures

The following discussion describes skinnable touch device grip patterns techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 and example devices 200 and 300 of FIGS. 2 and 3, respectively. In at least some embodiments, the procedures may be performed by a suitably configured computing device, such as the example computing device 102 of FIG. 1 that includes or otherwise make use of a skin driver module 116 to control a touch-aware skin 118.

Figure 4:
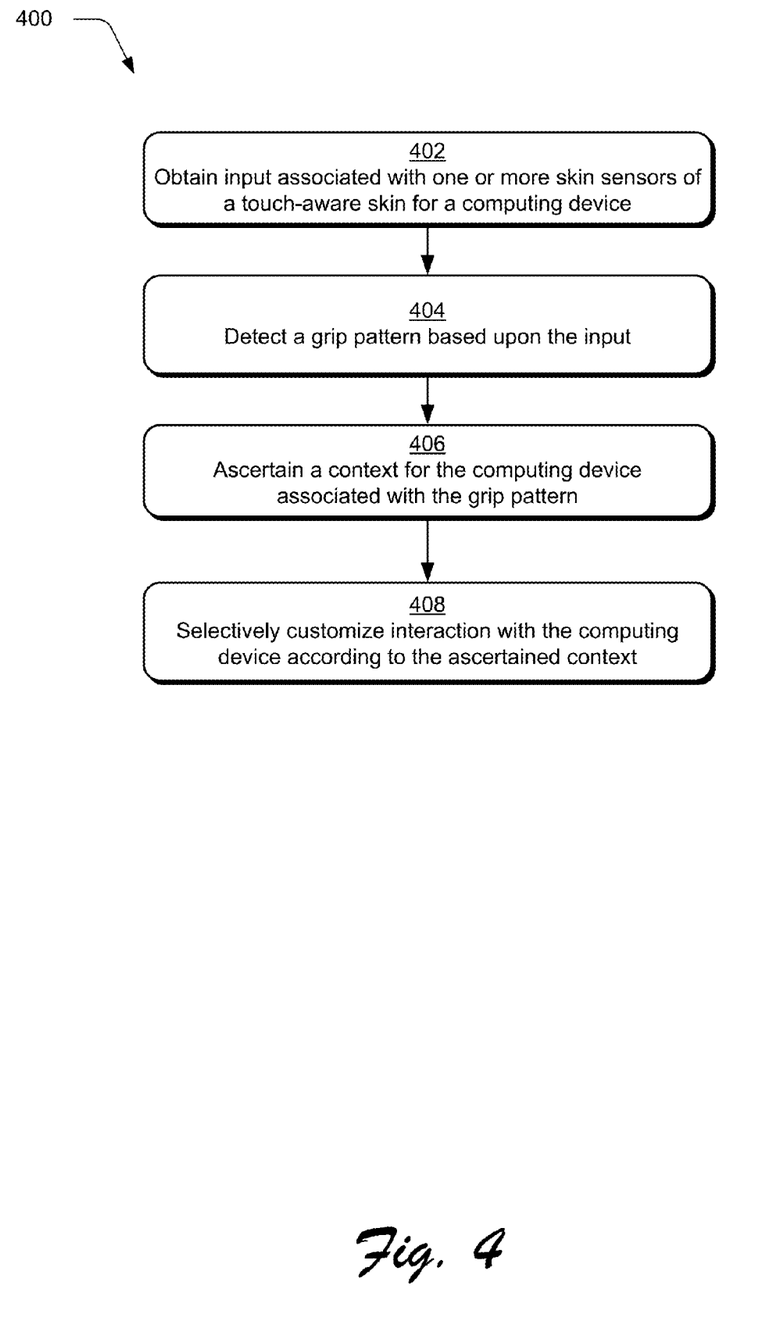
FIG. 4 is a flow diagram depicting an example procedure to detect a grip pattern in accordance with one or more embodiments.

FIG. 4 depicts an example procedure 400 in which a grip pattern for a device is detected. Input is obtained that is associated with one or more skin sensors of a touch-aware skin for a computing device (block 402). The input may be obtained through various sensors associated with a device. For example, a skin driver module 116 may obtain input via various skin sensors 120 of a touch-aware skin 118 as described previously. The input may correspond to contact points by a user or object upon or proximate to the surfaces of the device. The skin driver module 116 may be configured to detect, decode, and process input associated with the touch-aware skin to adapt the behavior/functionality of the device accordingly.

In particular, a grip pattern is detected based upon the input (block 404). A variety of different grip patterns that are detectable by a skin driver module 116 may be defined for a device. In general, the grip patterns are defined to correspond to different ways in which a user may hold a device, rest a device against an object, set a device down, orient the device, place the device (e.g., on a table, in a stand, in a bag, etc.), and so forth. Each particular grip pattern is specified by a particular pattern of touch interaction and/or contact points with the skin at designated locations. A variety of parameters for contacts can be used to define different grip patterns including but not limited to the size, location, shape, orientation, applied pressure (e.g., hard or soft), and/or number of contact points.

By way of example, a user may hold a tablet device with one hand such that the user's thumb contacts the front "viewing" surface and the user's fingers are placed behind the device for support. Holding the tablet device in this manner creates a particular combination of contact points that may defined as one grip pattern. A variety of other example grip patterns are also contemplated. A skin driver module 116 may be encoded with or otherwise make use of a database of different grip pattern definitions that relate to different ways a device may be held or placed. Accordingly, the skin driver module 116 may reference grip pattern definitions to recognize and differentiate between different interaction with a touch-aware skin of a computing device.

A context is ascertained for the computing device that is associated with the detected grip pattern (block 406) and interaction with the computing device is selectively customized according to the ascertained context (block 408). For example, the skin driver module 116 may be configured to associate different grip patterns with different contexts for interaction with the device. The different contexts may be used to cause corresponding actions such as customizing device operation, adapting device functionality, enabling/disabling features, optimizing the device and otherwise selectively performing actions that match a current context. Thus, the behavior of a device may change according to different contexts.

In other words, different grip patterns may be indicative of different kinds of user and/or device activities. For instance, the example above of holding a tablet device may be associated with a reading context. Different types of holds and corresponding grip patterns may be associated with other contexts, such as watching a video, web-browsing, making a phone call, and so forth. The skin driver module 116 may be configured to support various contexts and corresponding adaptations of a device. Accordingly, grip patterns can be detected to discover corresponding contexts, differentiate between different contexts, and customize or adapt a device in various ways to match a current context, some illustrative examples of which are described just below.

For instance, grip position can be used as a basis for modifying device user interfaces to optimize the user interfaces for a particular context and/or grip pattern. For example, the positions of windows, pop-ops, menus and commands may be moved depending on where a device is being gripped. Thus, if a grip pattern indicates that a user is holding a device in their left hand, a dialog box that is triggered may appear opposite the position of the grip, e.g., towards the right side of a display for the device. Likewise, a right-handed or two-handed grip may cause corresponding adaptations to positions for windows, pop-ups, menus and commands. This helps to avoid occlusions and facilitate interaction with the user interface by placing items in locations that are optimized for grip.

In another example, a soft keyboard may be optimized based on grip position. For example, the location and size of keyboard may change to match a grip pattern. This may include altering the keyboard based on orientation of the device determined at least partially through a grip pattern. In addition, algorithms used in a text input context for keyboard key hits, word predictions, spelling corrections, and so forth may be tuned according to grip pattern. This may involve adaptively increasing and or decreasing the sensitivity of keyboard keys as a grip pattern used to interact with the device changes.

Grip patterns determined through skin sensors can also assist in differentiating between intentional inputs (e.g., explicit gestures) and grip-based touches that may occur based upon a user's hand positions when holding a device. This can occur by selectively changing touchscreen and/or "on-skin" touch sensitivity based upon grip patterns at selected locations. For instance, sensitivity of a touchscreen can be decreased at one or more locations proximate to hand positions (e.g. at, surrounding, and/or adjacent to determined contact points) associated with holding a device and/or increased in other areas. Likewise, skin sensor sensitivity for "on-skin" interaction can be adjusted according to a grip pattern by selectively turning sensitivity of one or more sensors up or down. Adjusting device sensitivities in this manner can decrease the chances of a user unintentionally triggering touch-based controls and responses due particular to hand positions and/or grips.

In another approach, different grip patterns may be used to activate different areas and/or surfaces of a device for touch-based interaction. Because sensors are located on multiple different surfaces, the multiple surfaces may be used individually and/or in varying combinations at different times for input and gestures. A typical tablet device or mobile phone has six surfaces (e.g., front, back, top edge, bottom edge, right edge, and left edge) which may be associated with sensors and used for various techniques described herein. Additionally, different surfaces may be selectively activated in different contexts. Thus, the touch-aware skin 118 enables implementation of various "on-skin" gestures that may be recognized through interaction with the skin on any one or more of the device surfaces. Moreover, a variety of combination gestures that combine on-skin input and on-screen input applied to a traditional touchscreen may also be enabled for a device having a touch-aware skin 118 as described herein.

Consider by way of example a default context in which skin sensors on the edges of a device may be active for grip sensing, but may be deactivated for touch input. One or more edges of the device may become active for touch inputs in particular contexts as the context changes. In one example scenario, a user may hold a device with two hands located generally along the short sides of the device in a landscape orientation. In this scenario, a top edge of the device is not associated with grip-based contacts and therefore may be activated for touch inputs/gestures, such as enabling volume or brightness control by sliding a finger along the edge or implementing other on-skin controls on the edge such as soft buttons for a camera shutter, zoom functions, pop-up menu toggle, and/or other selected device functionality. If a user subsequently changes their grip, such as to hold the device along the longer sides in a portrait orientation, the context changes, the skin driver module 116 detects the change in context, and the top edge previously activated may be deactivated for touch inputs/gestures or may be switched to activate different functions in the new context.

In another example scenario, a user may interact with a device to view/render various types of content (e.g., webpages, video, digital books, etc.) in a content viewing context. Again, the skin driver module 116 may operate to ascertain the context at least in part by detecting a grip pattern via a touch-aware skin 118. In this content viewing context, a content presentation may be output via a display device of the computing device that is located on what is considered the front-side of the device. The back-side of the device (e.g., a side opposite the display device used to present the content) can be activated to enable various "on-skin" gestures to control the content presentation. By way of example, a user may be able to interact on the back-side to perform browser functions to navigate web content, playback functions to control a video or music presentation, and/or reading functions to change pages of digital book, change viewing settings, zoom in/out, scroll left/right, and so forth. The back-side gestures do not occlude or otherwise interfere with the presentation of content via the front side display as with some traditional techniques. Naturally, device edges and other surfaces may be activated in a comparable way in relation to various different contexts. A variety of other scenarios and "on-skin" gestures are also contemplated.

As mentioned, skins sensors 120 may be configured to detect interaction with objects as well as users. For instance, contact across a bottom edge may indicate that a device is being rested on a user's lap or a table. Particular contacts along various surfaces may along indicate that a device has been placed into a stand. Thus, a context for a device may be derived based on interaction with objects. In at least some embodiments, object interactions can be employed as an indication to contextually distinguish between situations in which a user actively uses a device, merely holds the device, and/or sets the device down or places the device in a purse/bag. Detection of object interactions and corresponding contexts can drive various responsive actions including but not limited to device power management, changes in notification modes for email, text messages, and/or phone calls, and display and user interface modifications, to name a few examples.

Thus, if the skin driver module 116 detects placement of a device on a table or night stand this may trigger power management actions to conserve device power. In addition, this may cause a corresponding selection of a notification mode for the device (e.g., selection between visual, auditory, and/or vibratory modes).

Further, movement of the device against a surface upon which the device is placed may also be detected through the skin sensors. This may enable further functionality and/or drive further actions. For example, a mobile device placed upon a desk (or other object) may act like a mouse or other input control device that causes the device display and user interface to respond accordingly to movement of the device on the desk. Here, the movement is sensed through the touch-aware skin. The mobile device may even operate to control another device to which the mobile device is communicatively coupled by a Bluetooth connection or other suitable connection.

In another example, device to device interactions between devices having touch-aware skins, e.g. skin to skin contact, may be detected through skin sensors and used to implement designated actions in response to the interaction. Such device to device on-skin interactions may be employed to establish skin to skin coupling for communication, game applications, application information exchange, and the like. Some examples of skin to skin interaction and gestures that may be enabled including aligning devices in contact end to end to establish a peer to peer connection, bumping devices edge to edge to transfer photos or other specified files, rubbing surfaces together to exchange contact information, and so forth.

It should be noted again that grip patterns ascertained from skin sensors 120 may be used in combination with other inputs such as touchscreen inputs, an accelerometer, motion sensors, multi-touch inputs, traditional gestures, and so forth. This may improve recognition of touches and provides mechanisms for various new kinds of gestures that rely at least in part upon grip patterns. For example, gestures that make used of both on-skin detection and touchscreen functionality may be enabled by incorporating a touch-aware skin as described herein with a device.

Figure 5:
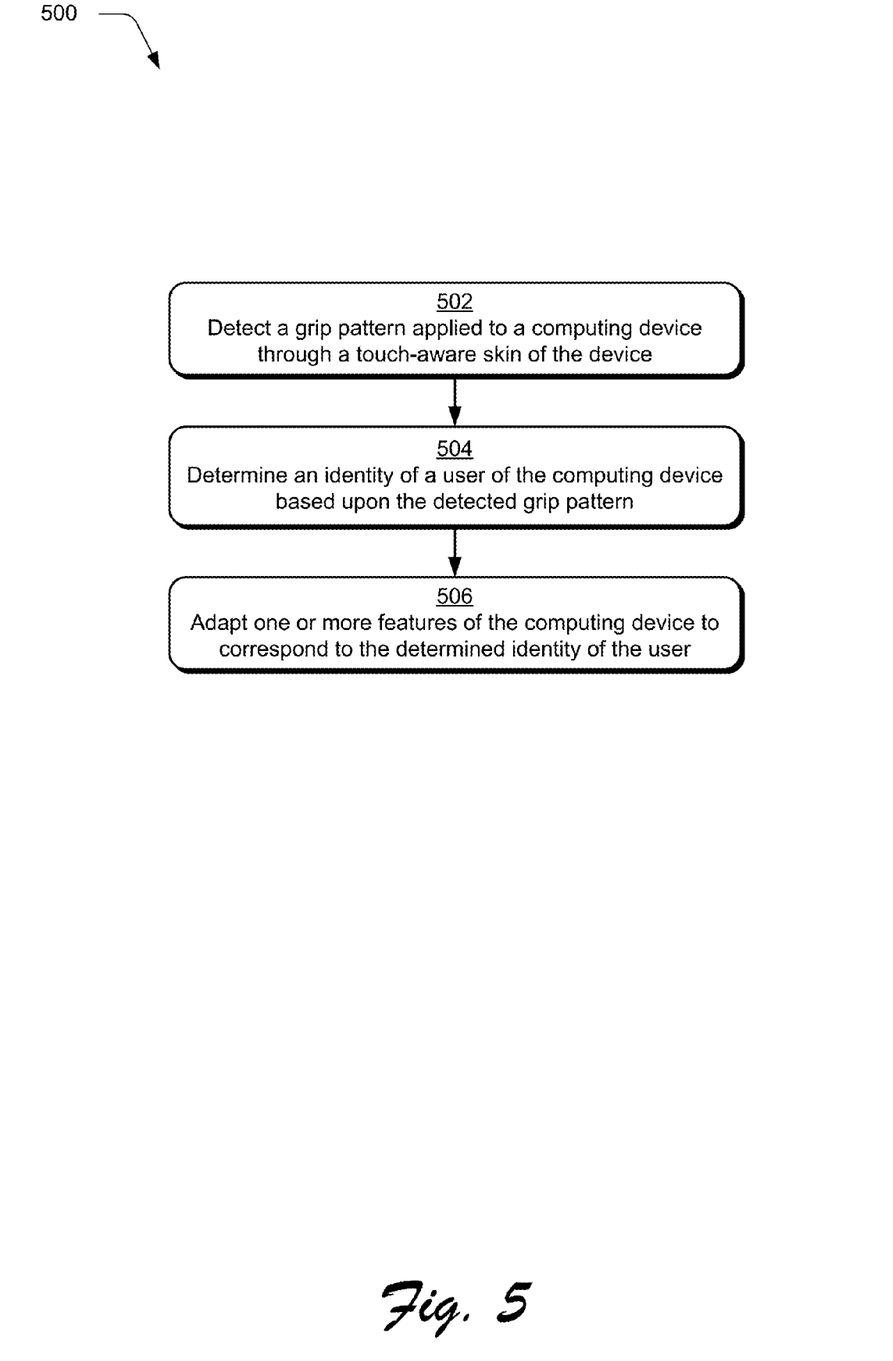
FIG. 5 is a flow diagram depicting an example procedure to identify a user based on a grip pattern in accordance with one or more embodiments.

FIG. 5 depicts an example procedure 500 in which a user is identified based on a grip pattern. A grip pattern applied to a computing device through a touch-aware skin is detected (block 502). Grip patterns may be detected through a touch-aware skin 118 in the manner previously described. An identity of a user of the computing device is determined based upon the detected grip pattern (block 504). This may occur in any suitable way.

For instance, grip patterns may be used to identify a user of the device by the way in which the user holds the device. To do so, particular users and/or types of users (e.g., adult or child) may be associated with a particular grip pattern. This may occur automatically to differentiate users based upon different grip patterns having different contact parameters. For instance, an adult user may be differentiated from a child user based upon at least the size of contact points on the skin. Thus, in some cases a user may be generally identified as corresponding to a user type based on a grip pattern.

In another approach, users may be specifically identified by associating individual users with user specific grip patterns. When a particular grip pattern is detected, the grip pattern may be matched to a particular user to determine an identity of the user. In at least some embodiments, the user may register a specific grip pattern to associate with the user's identity. Thus, one user may register a three finger hold and another user may register a five finger hold for the purpose of user identification. On-skin gestures such as drawing initials on or swiping across a touch-aware skin in a particular manner may also be associated with user identities. In this approach, the user may be prompted to hold the device in a particular manner or otherwise provide grip-based identifying input.

Additionally or alternatively, a device may be configured to automatically learn grip patterns and characteristics of different users and form associations of the learned grip patterns with user identities. These associations may be formed using unregistered grip patterns that are learned by monitoring user interaction rather than thru explicit registrations. In this case, a user identity may be resolved based on the automatically created associations and/or without explicit input of a grip pattern by the user in response to a prompt.

Once an identity of a user is resolved, one or more features of the computing device are adapted to correspond to the determined identity of the user (block 506). A variety of user specific customizations are contemplated. In the case of a general determination of a user as a particular user type, access control permissions for different user types may be enforced. For example, parental controls may be enforced when a user is identified as a child based on the grip pattern. Likewise, when a specific user is identified, corresponding user preferences, permissions, access rights, and customizations for the device may be applied to adapt the device to the particular user. For instance, a user specific start-up screen or menu may be launched and/or other selected applications may be automatically launched contextually based on the identity. Further different applications and device functionally may be selectively enabled or disabled accordingly to user identity.

In another example, at least some skins sensors 120 may provide fingerprint recognition that may be used to determine user identity. One or more fingerprints or partial fingerprints corresponding to contact points 304 associated with the user's grip may be recognized through such sensors. Accordingly, if a user picks up and holds a device in a ready to use position, the device may be configured to identify the user through fingerprint sensors, automatically wake-up, log-in the particular user, and/or customize the environment in various ways to match the identified user. Accordingly, a variety of adaptations may be made to change features of a device to match a user identity determined at least in part using a touch-aware skin.

Figure 6:
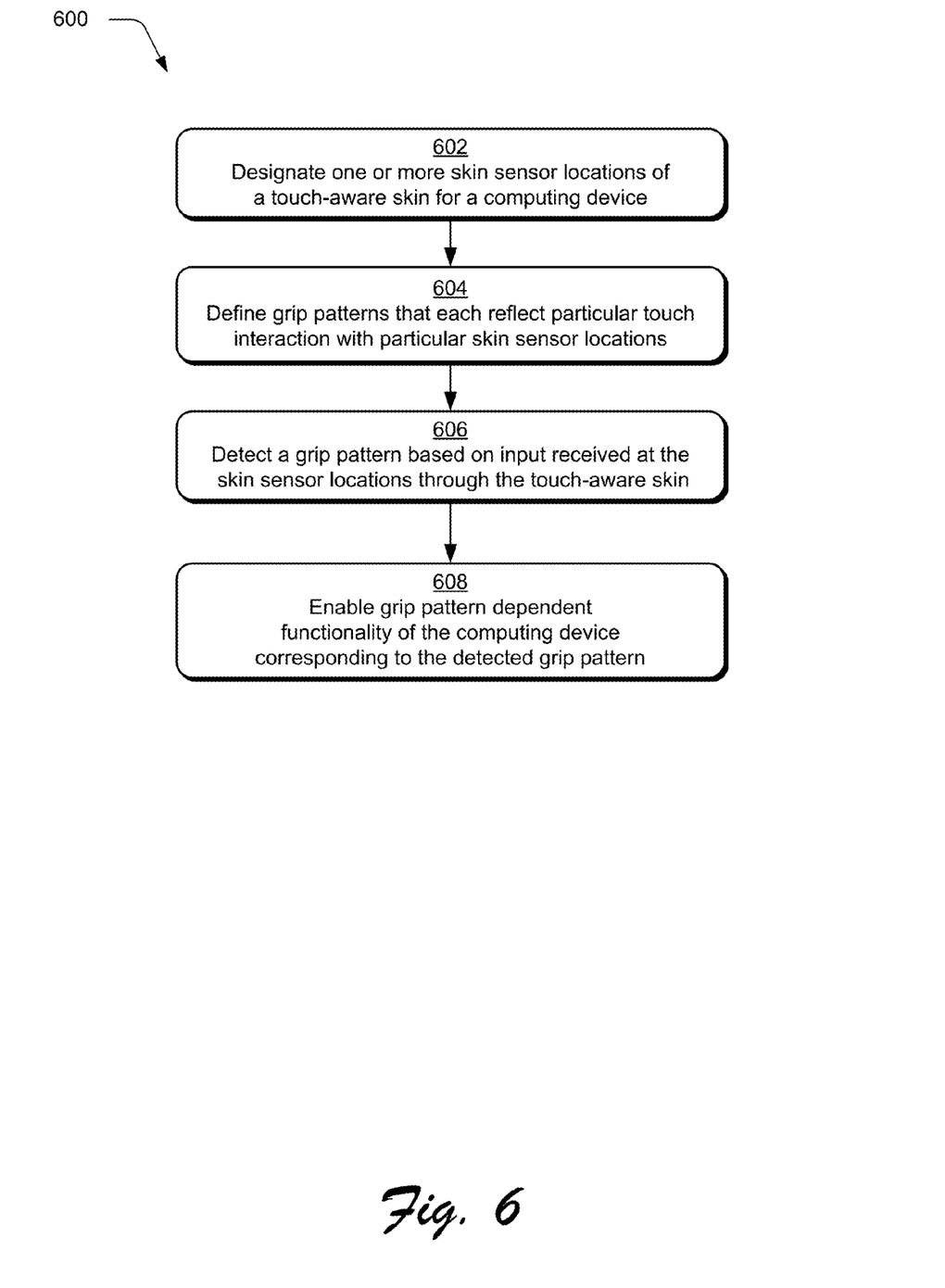
FIG. 6 is a flow diagram depicting an example procedure to use designated sensor locations of a touch-aware skin to define grip patterns and selectively enable device functionality.

FIG. 6 depicts an example procedure 600 in which designated sensor locations of a touch-aware skin are employed to define grip patterns and selectively enable device functionality. One or more skin sensor locations of a touch-aware skin for a computing device are designated (block 602). The sensor locations may correspond to physical sensors of a touch-aware skin 118. Logical sensor locations may also be defined on a sensor grid, such as the example shown and discussed in relation to FIG. 3. In some approaches, a calibration routine may be executed to establish locations and calibrate various sensors. This may involve prompting for and tracking touches at various locations on the skin and multiple surfaces of a device. Accordingly, skin sensors may be calibrated and recalibrated to define sensor locations and avoid having to precisely align sensor during manufacturing.

Grip patterns are defined that reflect particular touch interaction with particular skin sensor locations (block 604). Here, various grip patterns can be established and related to contact points upon the skin of a device. Grip patterns may be also associated with particular actions, users, types of users, device functionality and/or device contexts in a grip pattern database or otherwise.

A grip pattern is detected based on input received at the skin sensor locations through the touch-aware skin (block 606) and grip dependent functionality of the computing device corresponding to the detected grip pattern is enabled (block 608). For example, a skin driver module 116 may be implemented to distinguish between various grip patterns based on input obtained from skin sensors 120 as previously described. Once a grip pattern is detected, various actions can be taken to customize a device and the user experience to match the detected grip pattern, some examples of which were previously described. This may include selectively turning various functionality of the device on or off. In general, at least some functionality of the device may be dependent upon a corresponding grip pattern. For example, touchscreen functionality and/or particular touchscreen gestures may be adjusted based on a grip pattern. This may include changing touch sensitivity in different areas of the device, enabling or disabling touchscreen gestures based on a context associated with a grip pattern, activating combination gestures that are triggered by a combination of grip-based input (e.g., on-skin input) and touchscreen gestures, and so forth. Thus, grip patterns may be used in various ways to modify the functionality provided by a device at different times.

Having discussed some example procedures, consider now an example system that can be employed in one or more embodiments to implement aspects of skinnable touch device grip pattern techniques described herein.

Example System

Figure 7:
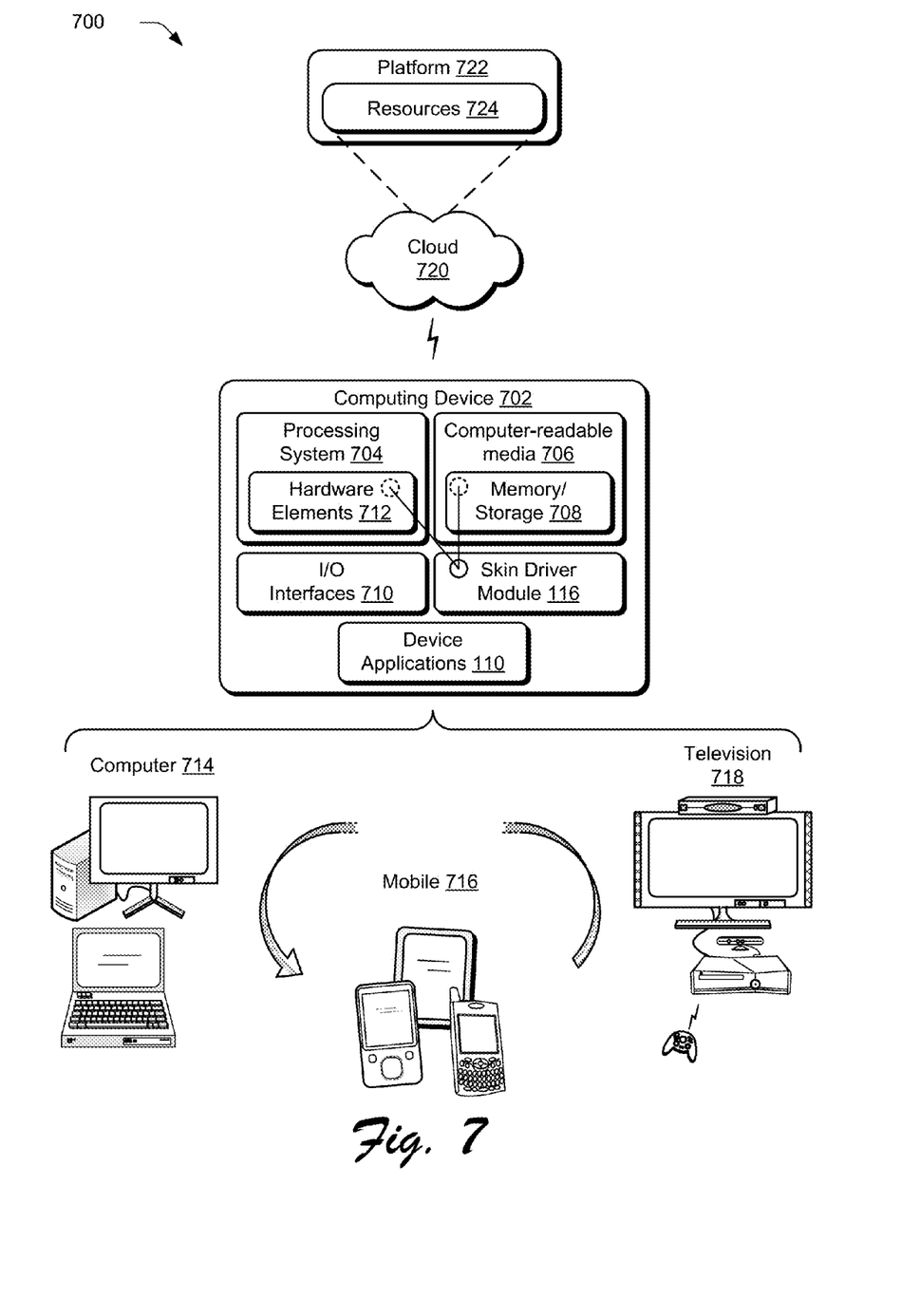
FIG. 7 illustrates various components of an example system that can be employed in one or more embodiments to implement aspects of skinnable touch device grip pattern techniques described herein.

FIG. 7 illustrates an example system generally at 700 that includes an example computing device 702 that is representative of one or more computing systems and/or devices that may implement the various techniques described herein. The computing device 702 may be, for example, a server of a service provider, a device associated with the client (e.g., a client device), an on-chip system, and/or any other suitable computing device or computing system.

The example computing device 702 includes a processing system 704 that may incorporate one or more processors or processing devices, one or more computer-readable media 706 which may include one or more memory and/or storage components 708, and one or more input/output (I/O) interfaces 710 for input/output (I/O) devices. Computer-readable media 706 and/or one or more I/O devices may be included as part of, or alternatively may be coupled to, the computing device 702. As illustrated, the processing system 704 may also include one or more hardware elements 712 representative of functionality to implement at least some aspects of the procedures and techniques described herein in hardware. Although not shown, the computing device 702 may further include a system bus or data transfer system that couples the various components one to another. A system bus can include any one or combination of different bus structures, such as a memory bus or memory controller, a peripheral bus, a universal serial bus, and/or a processor or local bus that utilizes any of a variety of bus architectures.

The processing system 704, processors, and hardware elements 712 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 708 represents memory/storage capacity associated with one or more computer-readable media. The memory/storage component 708 may include volatile media (such as random access memory (RAM)) and/or nonvolatile media (such as read only memory (ROM), Flash memory, optical disks, magnetic disks, and so forth). The memory/storage component 708 may include fixed media (e.g., RAM, ROM, a fixed hard drive, etc.) as well as removable media (e.g., a Flash memory drive, a removable hard drive, an optical disk, and so forth).

Input/output interface(s) 710 allow a user to enter commands and information to computing device 702, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processing systems, hardware elements, computer-readable media and/or memory/storage components.

An implementation of the described modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Hardware elements 712 are representative of instructions, modules, programmable device logic and/or fixed device logic implemented in a hardware form that may be employed in some embodiments to implement at least some aspects of the described techniques. Hardware elements may include components of an integrated circuit or on-chip system, an application-specific integrated circuit (ASIC), a field-programmable gate array (FPGA), a complex programmable logic device (CPLD), and so forth. In this context, a hardware element may operate as a processing device that performs program tasks defined by instructions, modules, and/or logic embodied by the hardware element.

Combinations of the foregoing may also be employed to implement various techniques and modules described herein. Accordingly, software, hardware, or program modules, including the skin driver module 116, device applications 110, and other program modules, may be implemented as one or more instructions and/or logic embodied on some form of computer-readable media and/or by one or more hardware elements 712. The computing device 702 may be configured to implement particular instructions and/or functions corresponding to the software and/or hardware modules. The instructions and/or functions may be executable/operable by one or more articles of manufacture (for example, one or more computing devices 702 and/or processing systems 704) to implement techniques, modules, and example procedures for skinnable touch device grip patterns described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on. The techniques described herein may be supported by these various configurations of the computing device 702 and are not limited to the specific examples the techniques described herein. This is illustrated through inclusion of the device applications 110 on the computing device 702. Functionality of one or more device applications 110 may also be implemented all or in part through use of a distributed system, such as over a "cloud" 720 via a platform 722.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of the functionality described herein may be distributed throughout the system 700. For example, the functionality may be implemented in part on the computing device 702 as well as via the platform 722 that abstracts the functionality of the cloud 720.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    obtaining input associated with a plurality of skin sensors of a touch-aware skin for a computing device, the plurality of skin sensors disposed across available outer surfaces of a housing for the computing device to form a continuous grid;
    detecting a combination of a grip pattern and a device placement based upon the input;
    ascertaining a context for the computing device associated with the combination of the grip pattern and the device placement as detected, the device placement corresponding at least in part to contact between the computing device and an object;
    selectively activating and deactivating grip sensing and touch input of the skin sensors associated with different outer surfaces according to the ascertained context; and
    selectively customizing interaction with the computing device according to the ascertained context.

2. A method as described in claim 1, wherein the grip pattern corresponds to a particular way in which a user holds the computing device.

3. A method as described in claim 1, wherein detecting the input indicative of a scenario of use comprises detecting one or more contact points of the touch-aware skin with at least one of a user or the object.

4. A method as described in claim 1, wherein at least one of said skin sensors is configured as a capacitive touch sensor to detect interaction of users and objects on and proximate to a surface of the touch-aware skin.

5. A method as described in claim 1, wherein selectively customizing interaction comprises modifying a user interface for the computing device to optimize the user interface for the ascertained context.

6. A method as described in claim 1, wherein selectively customizing interaction comprises adapting a soft keyboard for the computing device to optimize the soft keyboard by changing one or more of a size, a location, or sensitivity of keyboard keys for the soft keyboard according to the detected grip pattern.

7. A method as described in claim 1, wherein selectively customizing interaction comprises changing touch sensitivity for one or more locations on a touchscreen of the computing device based upon the detected grip pattern to decrease unintentional triggering of touchscreen functionality due to hand positions.

8. A method as described in claim 1, wherein selectively customizing interaction according to the ascertained context comprises:
enabling one or more on-skin gestures,
enabling one or more on-screen gestures, and
enabling one or more combination gestures that combine on-skin input and on-screen input.

9. A computing device comprising:
a processing system;
a touch-aware skin having one or more skin sensors that form a grid substantially covering outer surfaces of the computing device including over edges and a back-side of the computing device; and
a skin driver module operable via the processing system to control the touch-aware skin; including:
obtaining input received via the one or more skin sensors at designated locations of the touch-aware skin;
detecting a combination of a grip pattern and a device placement based upon the input received at the designated locations of the touch-aware skin, the device placement corresponding at least in part to contact between the computing device and an object;
deriving a context for interaction with the device that reflects the combination of the grip pattern and the device placement as detected;
selectively activating and deactivating grip sensing and touch input of the one or more skin sensors according to the derived context;
selectively adjusting sensitivity of the one or more skin sensors corresponding to the derived context; and
enabling grip dependent functionality of the computing device corresponding to the derived context.

10. A computing device as described in claim 9, wherein the grid is formed as a grid of wired sensors molded into a housing of the computing device.

11. A computing device as described in claim 9, wherein enabling grip dependent functionality comprises:
determining an identity of a user of the computing device based upon the detected grip pattern;
enforcing parental controls when the user is identified as a child based upon the detected grip pattern; and
adapting one or more features of the computing device to correspond to the determined identity of the user.

12. A computing device as described in claim 9, wherein enabling grip dependent functionality comprises activating multiple different surfaces of the computing device for touch-based interaction based upon the detected grip pattern.

13. A computing device as described in claim 9, wherein enabling grip dependent functionality comprises activating one or more on-skin gestures applicable to the touch-aware skin based upon the detected grip pattern.

14. A computing device as described in claim 9, wherein enabling grip dependent functionality comprises:
ascertaining a content viewing context corresponding to the detected grip pattern in which a content presentation is output for viewing via a display device of the computing device; and
activating the back-side of the computing device for input of one or more on-skin gestures to control the content presentation.

15. A computing device as described in claim 9, wherein enabling grip dependent functionality comprises implementing one or more on-skin controls for selected device functionality on one or more surfaces of the touch-aware skin based upon a context associated with the detected grip pattern.

16. A computing device as described in claim 9, wherein the one or more sensors are configured to detect direct contact with the touch-aware skin, proximity to the touch-aware skin, forces applied to the touch-aware skin, and deformations of the touch-aware skin.

17. A computing device as described in claim 9, wherein the touch-aware skin is configured as a removable add-on for the computing device.

18. One or more computer-readable storage media storing instructions that, when executed via a computing device, cause the computing device to implement a skin driver module configured to perform operations including:
detecting input applied to the computing device through a touch-aware skin of the computing device configured as a grid of sensors formed within the touch-aware skin substantially covering at least a back side of the computing device;
detecting a combination of a grip pattern and a device placement based upon the applied input;
ascertaining a context for the computing device that reflects the combination of the grip pattern and the device placement as detected, the device placement corresponding at least in part to contact between the computing device and an object;
determining an identity of a user of the computing device based upon the detected grip pattern;
selectively activating and deactivating grip sensing and touch input of the sensors according to the ascertained context;
selectively turning sensitivity of the activated sensors up or down based upon the ascertained context; and
adapting one or more features of the computing device to correspond to the determined identity of the user.

19. One or more computer-readable storage media as described in claim 18, wherein adapting one or more features of the computing device comprises automatically applying user preferences and permissions corresponding to the identity of the user that is determined.

20. One or more computer-readable storage media as described in claim 18, wherein determining the identity of the user comprises:
- associating the user with a grip pattern registered by the user; and
- matching the detected grip pattern to the grip pattern registered by the user to resolve the identity of the user.

\* \* \* \* \*